(12) United States Patent
Neitzell et al.

(10) Patent No.: US 9,156,097 B2
(45) Date of Patent: Oct. 13, 2015

(54) RECIPROCATING SAW BLADE CLAMP

(71) Applicant: Milwaukee Electric Tool Corporation, Brookfield, WI (US)

(72) Inventors: Roger D. Neitzell, Palmyra, WI (US); Courtney D. McCool, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 383 days.

(21) Appl. No.: 13/832,824

(22) Filed: Mar. 15, 2013

(65) Prior Publication Data
US 2013/0247392 A1 Sep. 26, 2013

Related U.S. Application Data

(60) Provisional application No. 61/613,296, filed on Mar. 20, 2012.

(51) Int. Cl.
*B23D 51/10* (2006.01)
*B23D 61/12* (2006.01)

(52) U.S. Cl.
CPC .............. *B23D 51/10* (2013.01); *B23D 61/123* (2013.01)

(58) Field of Classification Search
CPC ...... B23D 49/10; B23D 51/10; B23D 61/123; B27B 19/09; B26B 7/00
USPC ................................. 30/392–394; 279/71–75
See application file for complete search history.

(56) References Cited

U.S. PATENT DOCUMENTS

| | | | | |
|---|---|---|---|---|
| 2,987,086 A | | 6/1961 | Westlund, Jr. | |
| 3,927,893 A | * | 12/1975 | Dillon et al. | 279/75 |
| 3,929,050 A | | 12/1975 | Salzwedel | |
| 4,083,112 A | * | 4/1978 | Palm | 30/392 |
| 4,106,181 A | | 8/1978 | Mattchen | |
| 4,204,692 A | * | 5/1980 | Hoffman | 279/75 |
| 4,248,284 A | | 2/1981 | Tomosada | |
| 4,294,013 A | * | 10/1981 | Krieg | 30/392 |
| 4,470,196 A | * | 9/1984 | Hoffman | 30/392 |

(Continued)

FOREIGN PATENT DOCUMENTS

EP         2368659         9/2011

OTHER PUBLICATIONS

Search Report from the European Patent Office for Application No. 13159946.6 dated Sep. 13, 2013 (8 pages).

*Primary Examiner* — Jason Daniel Prone
(74) *Attorney, Agent, or Firm* — Michael Best & Friedrich LLP (57) ABSTRACT

A reciprocating saw that includes a spindle including a blade slot configured to receive a saw blade. The saw further includes a blade clamp operable to removably couple the saw blade to the spindle, and the blade clamp includes a first actuator pivotable about the spindle between a locked position and an unlocked position, and a first locking member movable relative to the blade slot between an engaged position and a disengaged position in response to movement of the first actuator between the locked position and the unlocked position. The blade clamp further includes a second actuator pivotable about the spindle between a locked position and an unlocked position, and a second locking member movable relative to the blade slot between an engaged position and a disengaged position in response to movement of the second actuator between the locked position and the unlocked position.

23 Claims, 11 Drawing Sheets

(56) References Cited

U.S. PATENT DOCUMENTS

| | | | |
|---|---|---|---|
| 4,553,306 A * | 11/1985 | Mineck | 30/392 |
| 4,601,477 A * | 7/1986 | Barrett et al. | 30/394 |
| 4,648,182 A * | 3/1987 | Hoffman | 30/392 |
| 5,103,565 A | 4/1992 | Holzer, Jr. | |
| 5,295,426 A | 3/1994 | Planchon | |
| 5,322,302 A * | 6/1994 | Quirijnen | 30/392 |
| 5,324,052 A * | 6/1994 | Ortmann | 30/392 |
| 5,340,129 A | 8/1994 | Wright | |
| 5,433,457 A | 7/1995 | Wright | |
| 5,443,276 A * | 8/1995 | Nasser et al. | 30/392 |
| 5,458,346 A * | 10/1995 | Briggs | 30/392 |
| 5,573,255 A | 11/1996 | Salpaka | |
| 5,575,071 A * | 11/1996 | Phillips et al. | 30/392 |
| 5,661,909 A * | 9/1997 | Kondo et al. | 30/392 |
| 5,724,742 A | 3/1998 | Grabowski | |
| 5,809,657 A | 9/1998 | Mortensen | |
| 5,810,367 A * | 9/1998 | Holzer et al. | 30/392 |
| D402,516 S | 12/1998 | Okada | |
| 5,848,474 A * | 12/1998 | Fortney et al. | 30/392 |
| D406,023 S | 2/1999 | Okada | |
| 5,903,983 A * | 5/1999 | Jungmann et al. | 30/392 |
| RE36,269 E | 8/1999 | Wright | |
| 5,946,810 A | 9/1999 | Hoelderlin et al. | |
| 6,023,848 A | 2/2000 | Dassoulas et al. | |
| 6,101,726 A * | 8/2000 | Laverick | 30/392 |
| 6,112,420 A * | 9/2000 | Schickerling | 30/392 |
| 6,178,646 B1 | 1/2001 | Schnell et al. | |
| 6,209,208 B1 * | 4/2001 | Marinkovich et al. | 30/392 |
| 6,212,781 B1 * | 4/2001 | Marinkovich et al. | 30/394 |
| 6,233,833 B1 * | 5/2001 | Grant et al. | 30/392 |
| 6,260,281 B1 * | 7/2001 | Okumura et al. | 30/392 |
| 6,276,065 B1 * | 8/2001 | Osada et al. | 30/392 |
| D448,634 S | 10/2001 | Hickman | |
| 6,467,177 B2 * | 10/2002 | Eichberger | 30/392 |
| 6,499,908 B2 * | 12/2002 | Hauptmann et al. | 279/78 |
| D479,106 S | 9/2003 | Robertsson | |
| 6,612,039 B2 | 9/2003 | Kakiuchi et al. | |
| 6,662,698 B2 | 12/2003 | Wheeler et al. | |
| 6,694,624 B2 * | 2/2004 | Stefanopulos et al. | 30/392 |
| 6,725,548 B1 | 4/2004 | Kramer et al. | |
| 6,754,967 B2 * | 6/2004 | Lovell et al. | 30/392 |
| 6,755,423 B2 * | 6/2004 | Chiu | 279/75 |
| 6,848,186 B1 * | 2/2005 | Chen et al. | 30/392 |
| 6,851,194 B1 * | 2/2005 | Chen et al. | 30/392 |
| 6,854,187 B2 * | 2/2005 | Huan | 30/392 |
| 6,857,348 B1 | 2/2005 | Mason | |
| 6,860,489 B2 * | 3/2005 | Chen | 279/82 |
| 6,893,026 B2 * | 5/2005 | Yoshimura et al. | 30/392 |
| 7,121,774 B2 * | 10/2006 | Hirt et al. | 279/75 |
| D536,791 S | 2/2007 | Eskridge et al. | |
| 7,210,232 B2 * | 5/2007 | Guo | 30/392 |
| 7,225,546 B2 * | 6/2007 | Hartmann | 30/393 |
| 7,251,897 B2 | 8/2007 | Shuhua | |
| 7,257,900 B2 | 8/2007 | Wheeler et al. | |
| 7,278,640 B2 * | 10/2007 | Allan et al. | 279/79 |
| 7,387,054 B2 * | 6/2008 | Rajotte | 279/75 |
| 7,424,841 B2 * | 9/2008 | Liu | 279/22 |
| D578,848 S | 10/2008 | Camacho | |
| 7,441,338 B2 * | 10/2008 | Delfini et al. | 30/392 |
| 7,469,909 B2 * | 12/2008 | Strauch et al. | 279/75 |
| 7,493,698 B2 * | 2/2009 | Lee | 30/392 |
| 7,497,860 B2 | 3/2009 | Carusillo et al. | |
| D601,869 S | 10/2009 | Nelson | |
| D603,231 S | 11/2009 | Fisher et al. | |
| 7,665,216 B2 * | 2/2010 | Yasheng | 30/392 |
| 7,748,125 B2 | 7/2010 | Rakaczki | |
| 7,833,241 B2 * | 11/2010 | Gant | 30/392 |
| 7,861,418 B2 * | 1/2011 | Kretschmar et al. | 30/392 |
| 7,871,080 B2 | 1/2011 | Marini et al. | |
| 7,984,914 B1 * | 7/2011 | Paulsen | 279/75 |
| D645,330 S | 9/2011 | Jones et al. | |
| 8,046,926 B2 * | 11/2011 | Bigden et al. | 30/392 |
| 8,082,671 B2 * | 12/2011 | Saegesser | 30/392 |
| 8,112,895 B2 | 2/2012 | Rakaczki | 30/392 |
| 8,117,757 B2 * | 2/2012 | Kuo | 30/392 |
| 8,230,607 B2 * | 7/2012 | Limberg et al. | 30/392 |
| 8,261,456 B2 | 9/2012 | Scott et al. | |
| 8,272,135 B2 * | 9/2012 | Zhou | 30/392 |
| D687,275 S | 8/2013 | Neitzell | |
| D687,276 S | 8/2013 | Ji | |
| D688,543 S | 8/2013 | Neitzell et al. | |
| 8,550,471 B2 * | 10/2013 | Huang | 279/75 |
| 8,555,516 B2 * | 10/2013 | Graca | 30/392 |
| D695,083 S | 12/2013 | Neitzell et al. | |
| 8,622,400 B2 * | 1/2014 | Lin | 279/75 |
| 8,622,401 B2 * | 1/2014 | Puzio et al. | 279/75 |
| 8,800,999 B2 * | 8/2014 | Puzio et al. | 279/75 |
| 8,813,373 B2 * | 8/2014 | Scott | 30/392 |
| 8,858,559 B2 * | 10/2014 | Milburn et al. | 30/392 |
| 2002/0017026 A1 | 2/2002 | Kakiuchi et al. | |
| 2002/0042998 A1 | 4/2002 | Napoli | |
| 2004/0188957 A1 | 9/2004 | Hsing | |
| 2004/0194324 A1 * | 10/2004 | Youn-Chyuan | 30/392 |
| 2005/0132584 A1 * | 6/2005 | Cornwell et al. | 30/392 |
| 2006/0174495 A1 | 8/2006 | Junior | |
| 2007/0074405 A1 | 4/2007 | Nottingham et al. | |
| 2008/0104853 A1 * | 5/2008 | Hunger | 30/392 |
| 2008/0184852 A1 * | 8/2008 | Peters | 81/439 |
| 2009/0071015 A1 | 3/2009 | Scott | |
| 2009/0273146 A1 | 11/2009 | Dezheng et al. | |
| 2010/0175532 A1 | 7/2010 | Evatt et al. | |
| 2010/0218389 A1 | 9/2010 | Kalomeris et al. | |
| 2010/0228256 A1 | 9/2010 | Walen et al. | |
| 2011/0074122 A1 | 3/2011 | Marini et al. | |
| 2013/0075985 A1 * | 3/2013 | Chang | 279/144 |
| 2014/0173919 A1 | 6/2014 | Leman | 30/394 |
| 2014/0197609 A1 * | 7/2014 | Chen | 279/97 |
| 2015/0059192 A1 * | 3/2015 | Fragapane | 30/392 |
| 2015/0143705 A1 * | 5/2015 | Bozic | 30/166.3 |

* cited by examiner

RECIPROCATING SAW BLADE CLAMP

CROSS-REFERENCE TO RELATED APPLICATIONS

This application claims priority to U.S. Provisional Patent Application No. 61/613,296, filed Mar. 20, 2012, the entire contents of which are hereby incorporated by reference herein.

BACKGROUND

The present invention relates to reciprocating power tools, and more particularly to keyless blade clamps for quickly and easily replacing and securing a saw blade to a spindle of a reciprocating saw.

Reciprocating tools, such as reciprocating saws, include removable blades to permit the use of different types of blades and to allow for replacement of worn or damaged blades. Accordingly, reciprocating saws typically include a blade mounting system that allows for blade replacement while firmly coupling the blade to the tool. Often, blade mounting systems utilize a tool, such as an allen wrench or special key, in order to replace and secure the blade. Alternatively, the saw may include a keyless blade clamp that does not utilize a special tool.

SUMMARY

In one embodiment, the invention provides a reciprocating saw including a spindle having a blade slot configured to receive a saw blade, and a blade clamp operable to removably couple the saw blade to the spindle. The blade clamp includes a first actuator pivotable about the spindle between a locked position and an unlocked position, and a first locking member movable relative to the blade slot between an engaged position and a disengaged position in response to movement of the first actuator between the locked position and the unlocked position. The first locking member is configured to engage the saw blade to couple the saw blade to the spindle when the first locking member is in the engaged position and the first locking member is configured to allow removal of the saw blade from the blade slot when the first locking member is in the disengaged position. The blade clamp further includes a second actuator pivotable about the spindle between a locked position and an unlocked position, and a second locking member movable relative to the blade slot between an engaged position and a disengaged position in response to movement of the second actuator between the locked position and the unlocked position. The second locking member is configured to engage the saw blade to couple the saw blade to the spindle when the second locking member is in the engaged position and the second locking member is configured to allow removal of the saw blade from the blade slot when the second locking member is in the disengaged position.

In another embodiment, the invention provides a reciprocating saw including a spindle having a blade slot configured to receive a saw blade, and a blade clamp operable to removably couple the saw blade to the spindle. The blade clamp includes a first actuator movable relative to the spindle between a locked position and an unlocked position, and a first locking member movable relative to the blade slot between an engaged position and a disengaged position in response to movement of the first actuator between the locked position and the unlocked position. The first locking member is configured to engage the saw blade to couple the saw blade to the spindle when the first locking member is in the engaged position and the first locking member is configured to allow removal of the saw blade from the blade slot when the first locking member is in the disengaged position. The blade clamp further includes a second actuator movable relative to the spindle between a locked position and an unlocked position, and a second locking member movable relative to the blade slot between an engaged position and a disengaged position in response to movement of the second actuator between the locked position and the unlocked position. The second locking member is configured to engage the saw blade to couple the saw blade to the spindle when the second locking member is in the engaged position and the second locking member is configured to allow removal of the saw blade from the blade slot when the second locking member is in the disengaged position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
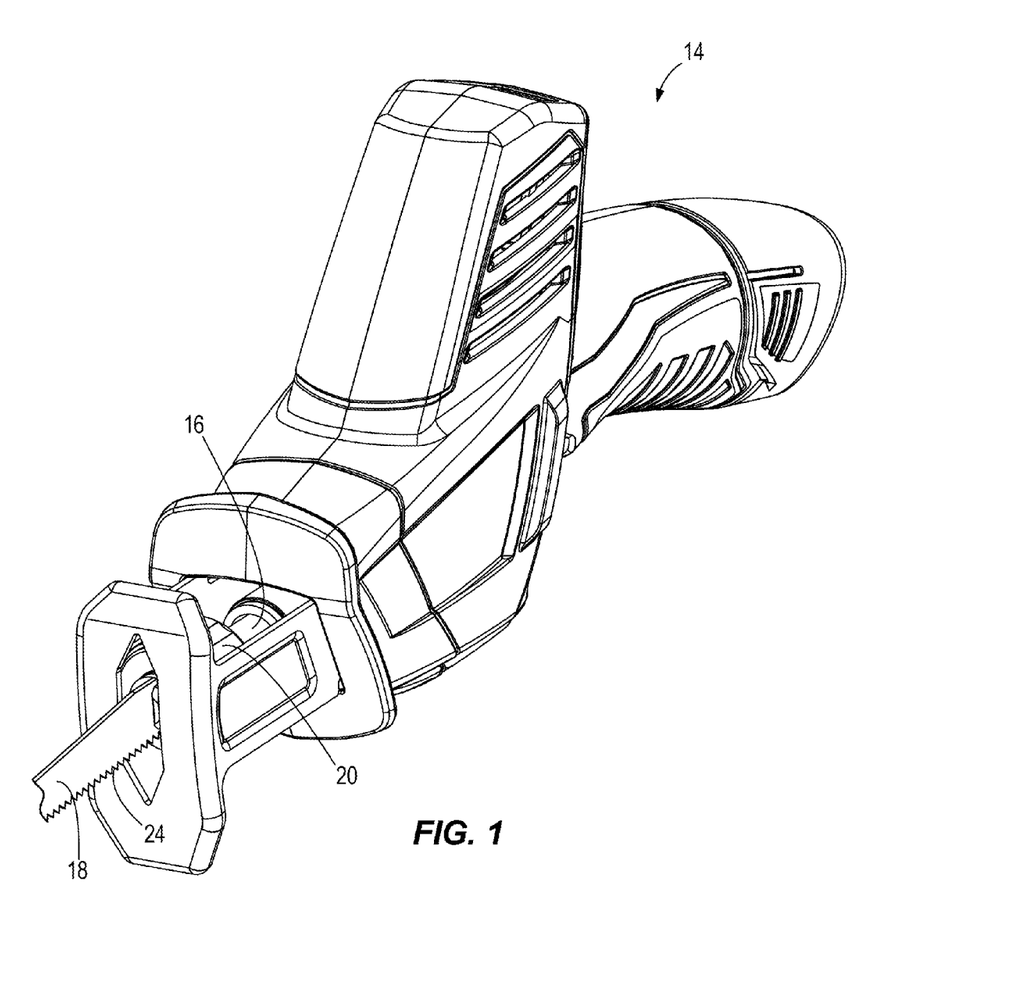
FIG. 1 is a perspective view of a reciprocating saw according to one embodiment of the invention.
Figure 2:
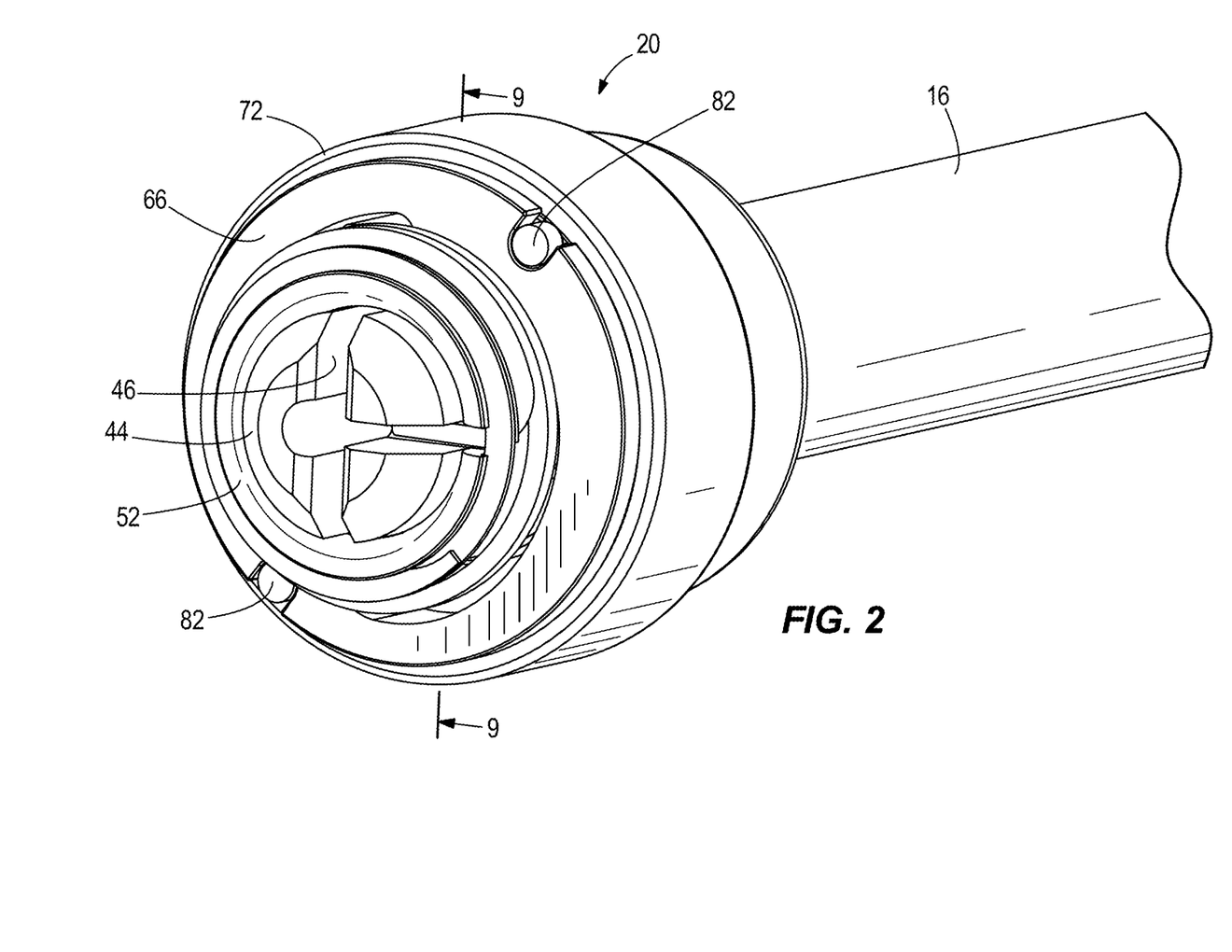
FIG. 2 is a perspective view of a spindle and a blade clamp of the saw of FIG. 1.

FIG. 1 illustrates a reciprocating saw 14. The reciprocating saw 14 includes a spindle 16, a blade 18, and a blade clamp 20 that couples the blade 18 to the spindle 16. The reciprocating saw 14 is operable to reciprocate the spindle 16, and thereby the blade 18.

Figure 11:
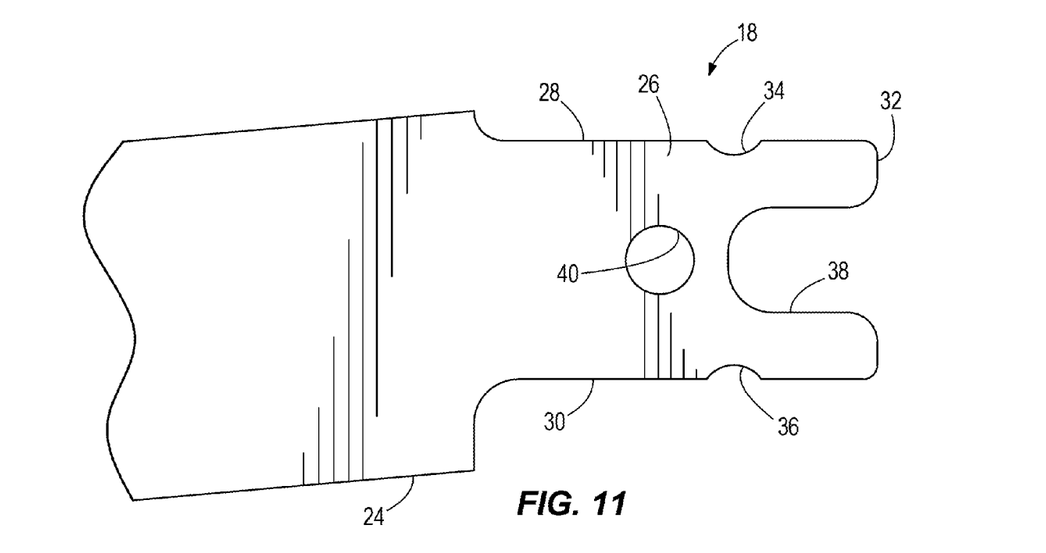
FIG. 11 is a side view of a saw blade for use with the saw of FIG. 1.

Referring to FIG. 11, the blade 18 includes a cutting edge 24 and a tang 26 that is received by the clamp 20 to couple the blade 18 to the spindle 16. The cutting edge 24 includes cutting teeth (shown in FIG. 1) that extend along the length of the cutting edge 24. The tang 26 includes a top edge 28, a bottom edge 30, and a back edge 32. A semi-circular aperture 34 is located on the top edge 28 and a semi-circular aperture 36 is also located on the bottom edge 30. A generally U-shaped aperture 38 opens to the back edge 32. A locking aperture 40 extends through the blade 18 from side to side as illustrated in FIG. 11.

Figure 5:
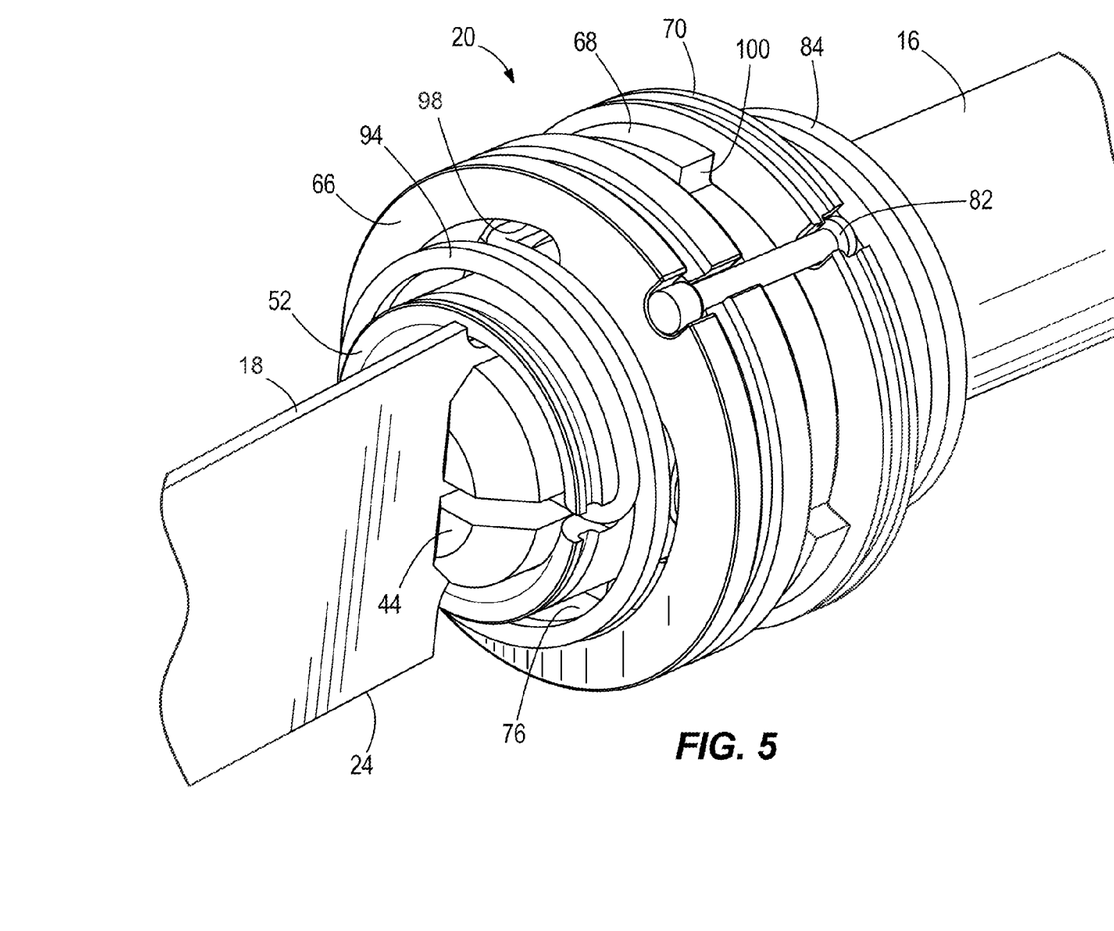
FIG. 5 is a perspective view of the spindle and the blade clamp of FIG. 2, with a portion of the blade clamp removed.
Figure 8:
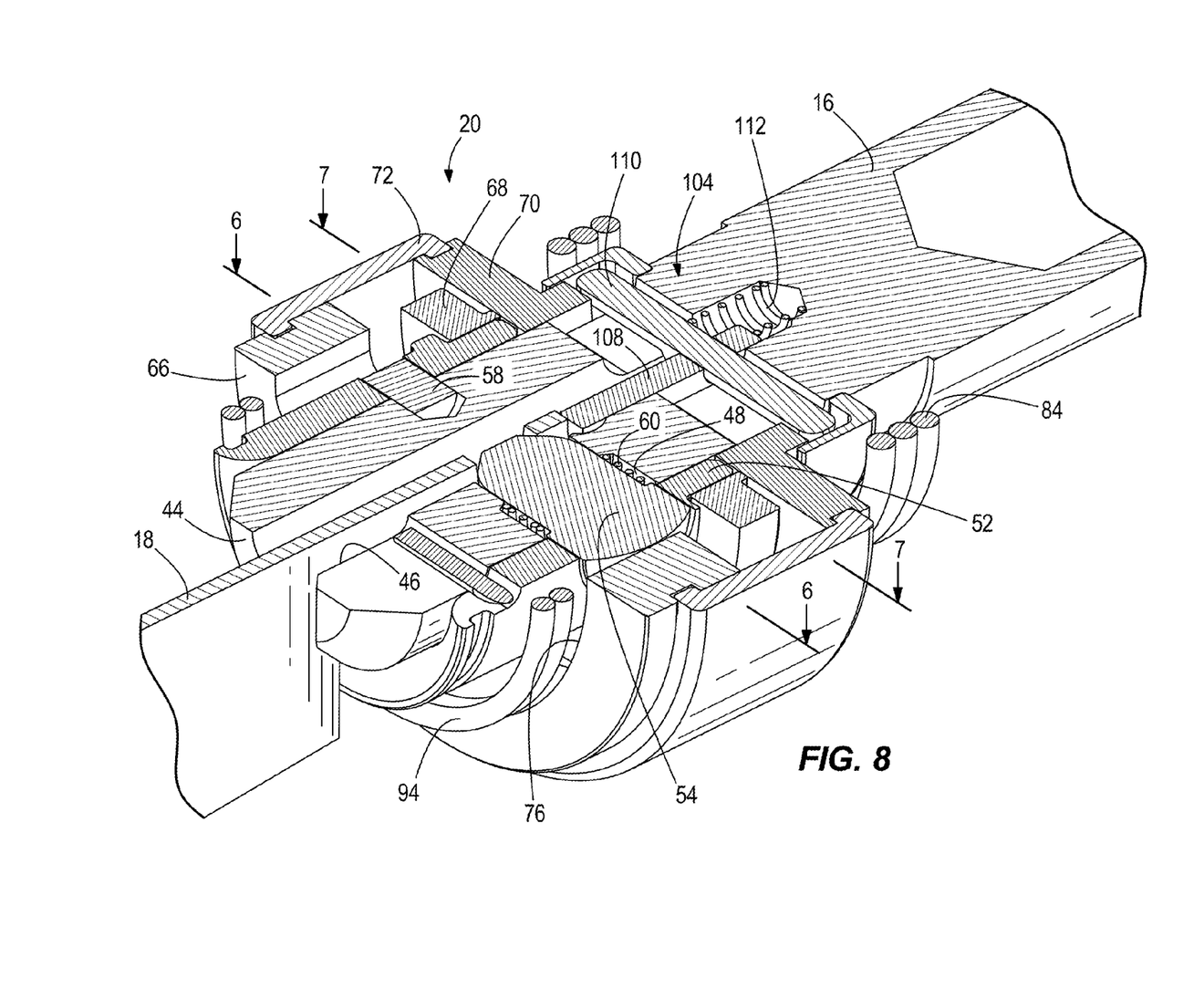
FIG. 8 is a cross-sectional view of the spindle and the blade clamp of FIG. 2 taken along lines 8-8 in FIG. 4.

Referring to FIGS. 5 and 8, the spindle 16 includes a front end 44 and a blade slot 46 that extends into the spindle 16 from the front end 44. A locking member aperture 48 extends generally normal to the blade slot 46 and the locking member aperture 48 extends into the blade slot 46.

Figure 6:
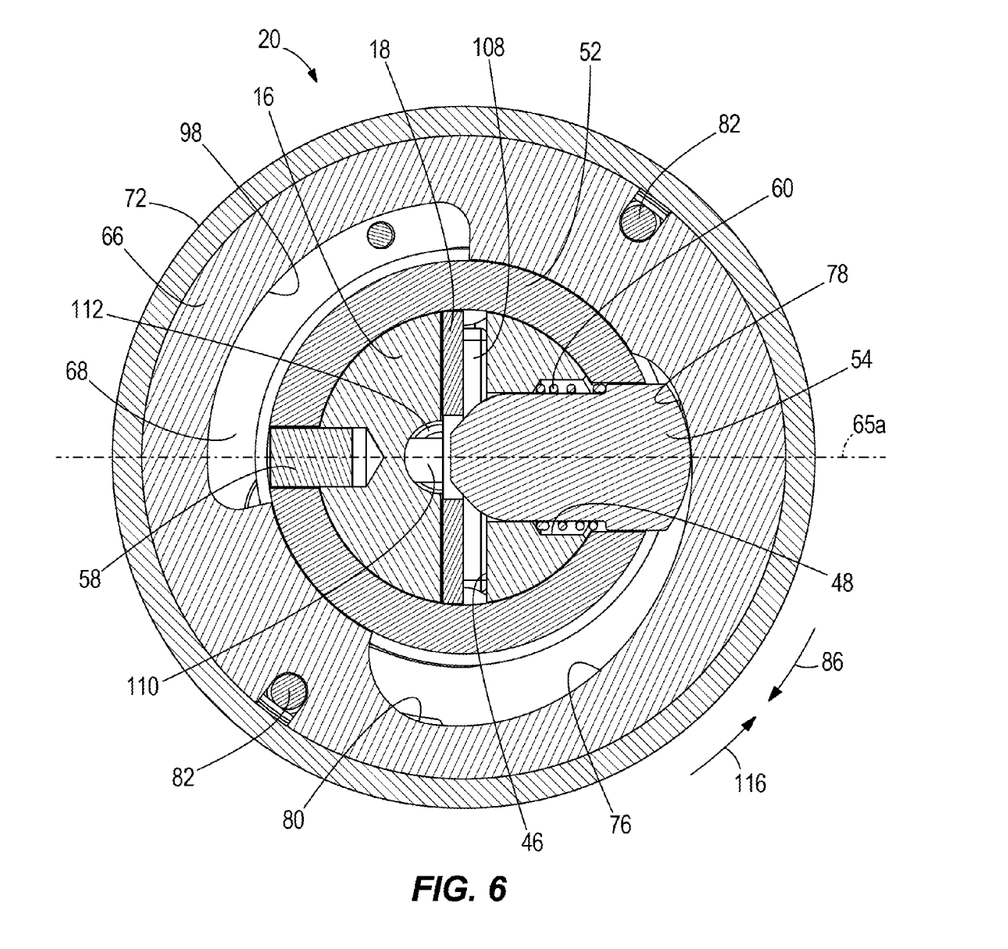
FIG. 6 is a cross-sectional view of the spindle and the blade clamp of FIG. 2 taken along lines 6-6 in FIG. 8.
Figure 7:
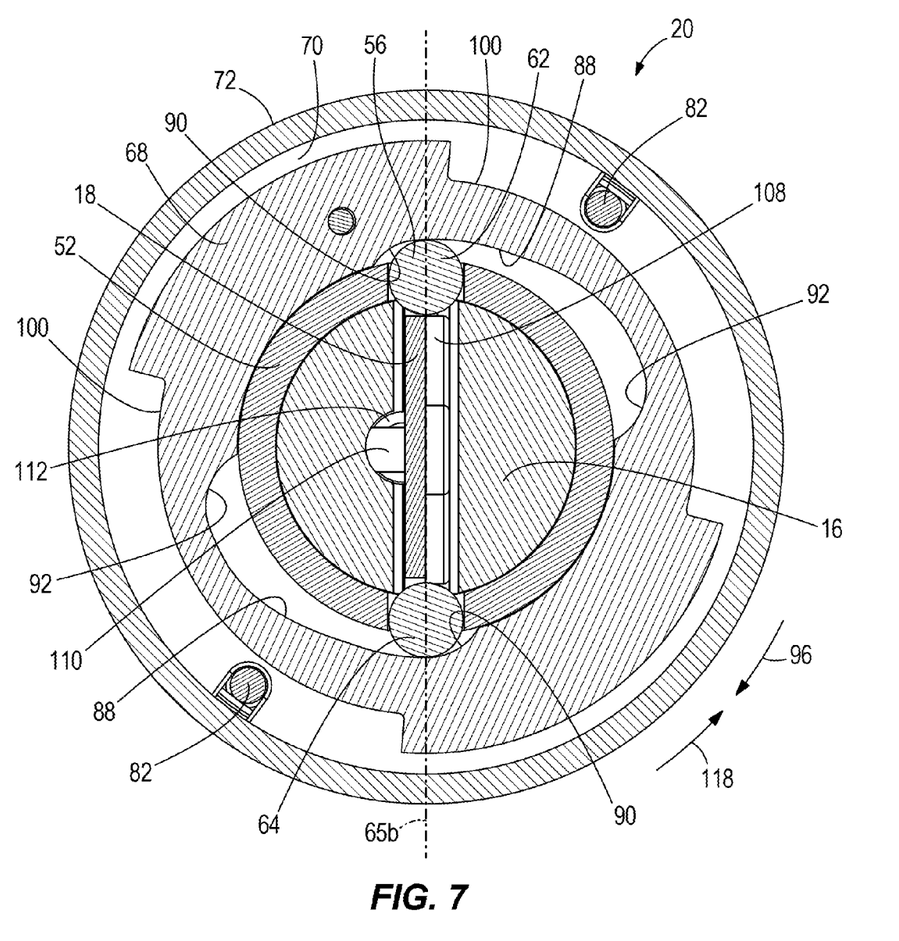
FIG. 7 is a cross-sectional view of the spindle and the blade clamp of FIG. 2 taken along lines 7-7 in FIG. 8.
Figure 9:
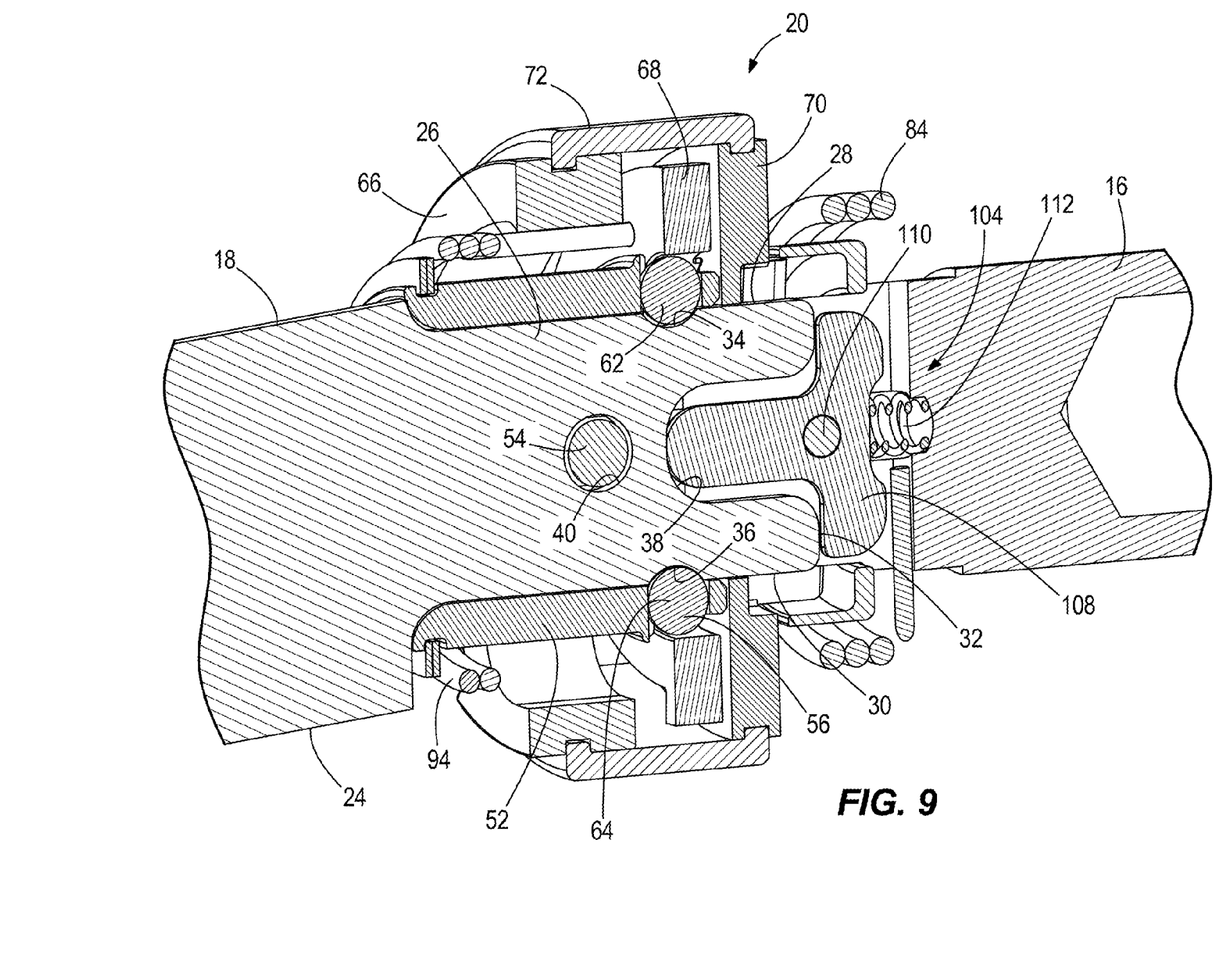
FIG. 9 is a cross-sectional view of the spindle and the blade clamp of FIG. 2 taken along lines 9-9 in FIG. 2.

Referring to FIGS. 8 and 9, the blade clamp 20 includes a sleeve 52, a first locking member 54, and a second locking member 56. The sleeve 52 couples the blade clamp 20 to the spindle 16 via a pin 58. The first locking member 54 is a pin in the illustrated embodiment that slides within the locking member aperture 48. A biasing member 60, which is a coil spring in the illustrated embodiment, biases the pin 54 out of the blade slot 46. The illustrated second locking member 56 includes a first ball 62 and a second ball 64 that is directly opposed to the first ball 62 (i.e., the first ball 62 is located 180 degrees from the second ball 64 around the spindle 16). Referring to FIGS. 6 and 7, as will be discussed in more detail below, the pin 54 moves into and out of the blade slot 46 on an axis 65a between engaged and disengaged positions of the pin 54. The balls 62 and 64 move into and out of the blade slot 46 on an axis 65b between engaged and disengaged positions. In the illustrated embodiment, the axis 65a is perpendicular to the axis 65b. In other embodiments, the axis 65a and the axis 65b may not be perpendicular to each other. For example, in other embodiments the angle between the axis 65a and the axis 65b can range from about 70 degrees to about 90 degrees. Also, in the illustrated embodiment, the balls 62 and 64 both move into and out of the blade slot 46 on the same axis 65b. In other embodiments, the balls 62 and 64 can move into an out of the blade slot on different axes. For example, in one embodiment, the upper ball 62 can move into and out of the blade slot 46 along an axis that is about 80 degrees relative to the axis 65a and the lower ball 64 can move into and out of the blade slot 46 along an axis that is about 75 degrees relative to the axis 65a. The angle measurements of 80 degrees and 75 degrees are merely exemplary and can be other suitable angles in other embodiments.

Figure 3:
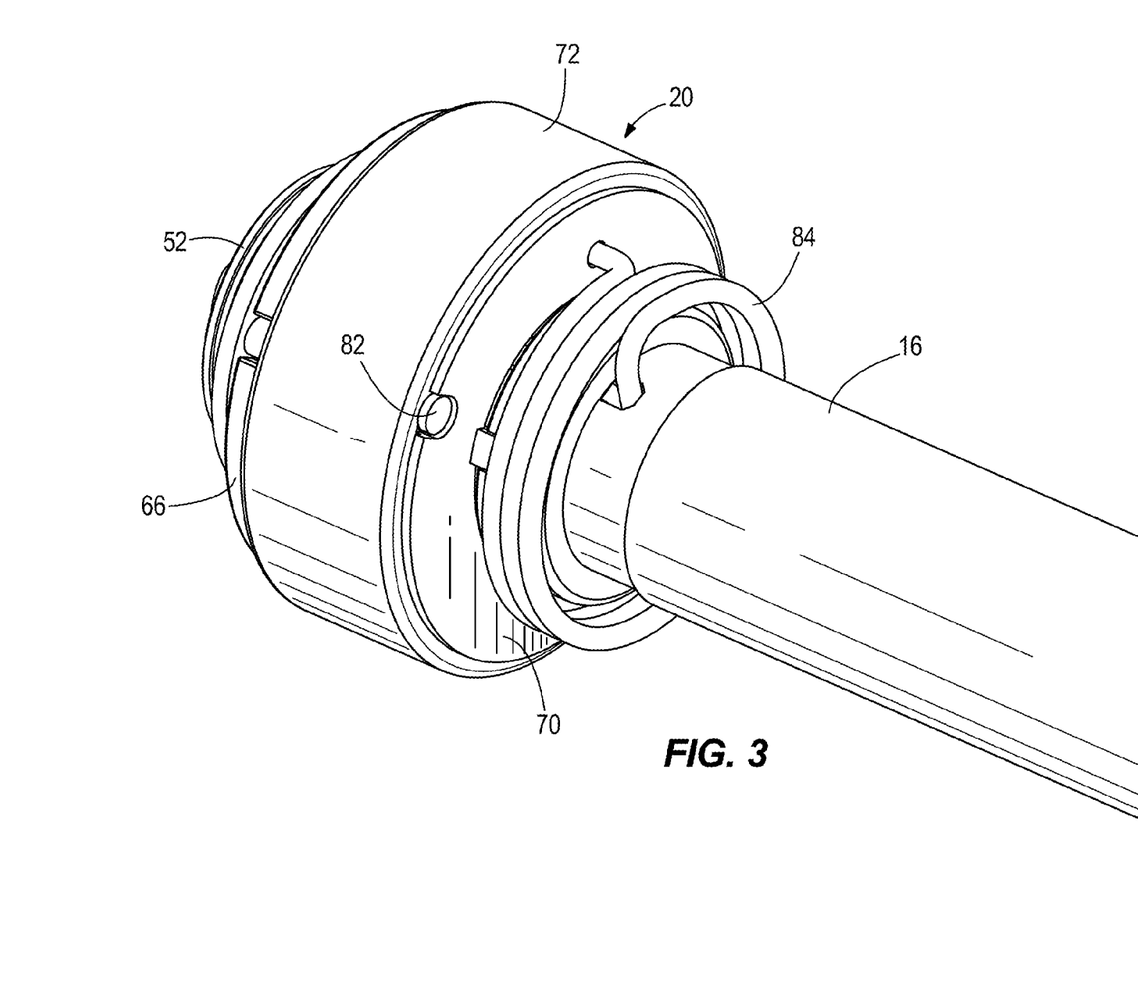
FIG. 3 is an alternative perspective view of the spindle and the blade clamp of FIG. 2.
Figure 4:
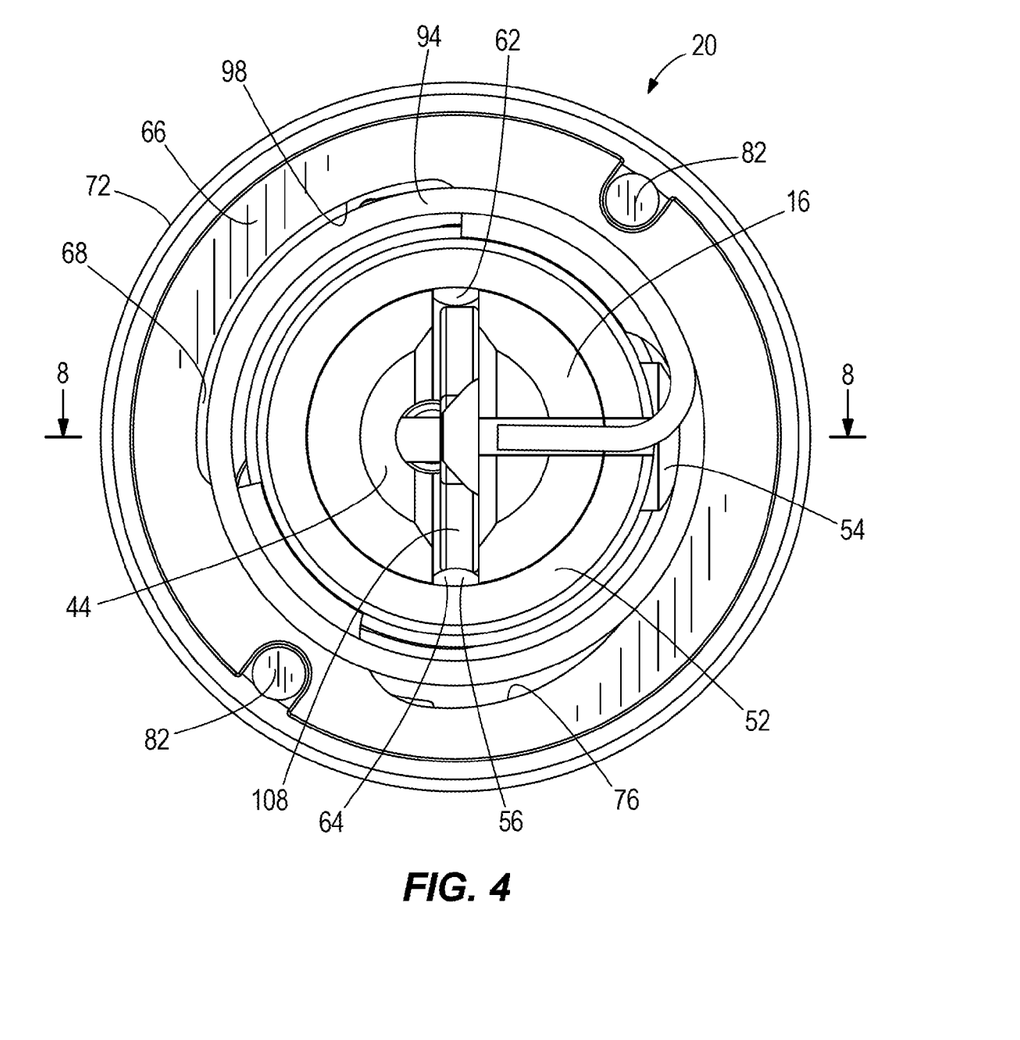
FIG. 4 is an end view of the spindle and the blade clamp of FIG. 2.

The blade clamp 20 further includes a first actuator 66, a second actuator 68, a base 70, and a cover 72. The first actuator 66 includes a recess 76 (FIG. 6) having a shallow end 78 and a deep end 80. The actuator 66 pivots or rotates around the spindle 16 relative to the spindle 16 and the pin 54 slides along actuator 66 within the recess 76 between the ends 78 and 80 to move the pin 54 into the blade slot 46 and allow the biasing member 60 to move the pin 54 out of the slot 46. Rods 82 (FIGS. 5 and 6) couple the first actuator 66 and the base 70 for co-rotation about the spindle 16. As best seen in FIG. 3, a biasing member 84, which is a torsion spring in the illustrated embodiment, rotationally biases the base 70 and the first actuator 66 around the spindle 16 in the direction of arrow 86 in FIG. 6. The cover 72, which is made from rubber in one embodiment, extends from the base 70 to the first actuator 66 and the cover 72 can be grabbed by a user to rotate the actuator 66, the base 70, and the cover 72 against the bias of the spring 84.

Referring to FIG. 7, the second actuator 68 includes recesses 88 each having a shallow end 90 and a deep end 92. The second actuator 68 pivots or rotates around the spindle 16 relative to the spindle 16. The balls 62 and 64 slide along the actuator 68 in the adjacent recess 88 between the ends 90 and 92 to move the balls 62 and 64 into the blade slot 46 and to allow the balls 62 and 64 to move out of the blade slot 46. A biasing member 94 (FIG. 5), which is a torsion spring in the illustrated embodiment, biases the actuator 68 around the spindle 16 in the direction of arrow 96 in FIG. 7. The biasing member 94 extends through a recess 98 (FIG. 6) in the first actuator 66 to couple to the second actuator 68. As will be discussed in more detail below, the second actuator 68 further includes recesses 100 that allow the second actuator 68 to rotate a predetermined amount with respect to the first actuator 66 about the spindle 16.

Figure 10:
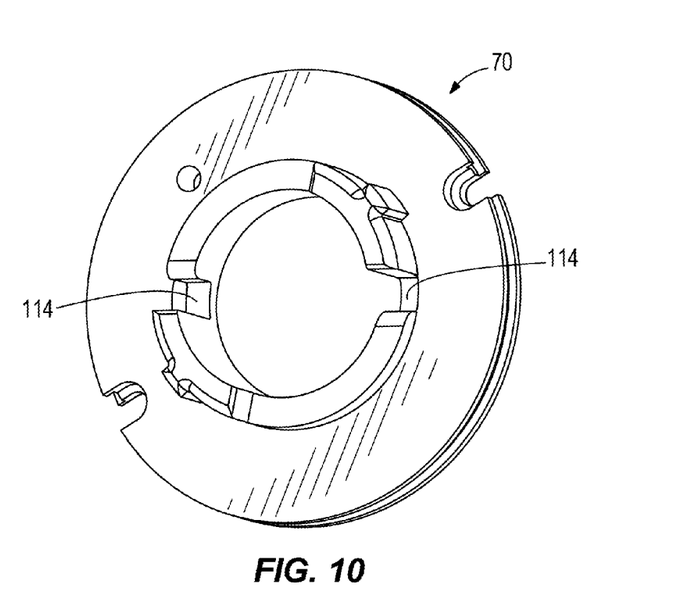
FIG. 10 is a perspective view of a portion of the blade clamp of the saw of FIG. 1.

Referring to FIGS. 8 and 10, in the illustrated embodiment, the blade clamp 20 further includes an ejector mechanism 104. The illustrated ejector mechanism 104 includes a plunger 108, a pin 110, and a biasing member 112, which is a coil spring in the illustrated embodiment. The spring 112 and the plunger 108 push the blade 18 out of the blade slot 46. The pin 110 moves into and out of slots 114 (FIG. 10) in the base 70 to hold the blade clamp 20 in an unlocked position, which will be discussed in more detail below.

In operation, the blade clamp 20 is moved from a locked position to an unlocked position to remove the blade 18 from the spindle 16. Referring to FIGS. 6, 7, and 9, in the locked position, the first actuator 66 pushes the pin 54 into the engaged position where the pin 54 is located in the slot 46 and through the locking aperture 40 of the blade 18 to couple the blade 18 to the spindle 16. The biasing member 84 rotationally biases the base 70, and therefore the first actuator 66 toward the locked position (i.e., in the direction of the arrow 86 of FIG. 6), because of the interconnection via the rods 82, and the actuator 66 pushes the pin 54 into the slot 46 and the actuator 66 holds the pin 54 in the engaged position. Also, in the locked position, the second actuator 68 pushes the balls 62 and 64 into the engaged position and holds the balls 62 and 64 in the engaged position where the balls 62 and 64 are located in the slot 46 and in the adjacent aperture 34 and 36 of the blade 18 to provide an additional clamping force to the blade 18 to couple the blade 18 to the spindle 16. The spring 94 rotates the second actuator 68 in the direction of the arrow 96 of FIG. 7 (i.e., toward the locked position) to push the balls 62 and 64 into the slot 46 and into engagement with the blade 18.

To release the blade 18 and uncouple the blade 18 from the spindle 16, the user rotates the cover 72 against the bias of spring 84 to rotate the first actuator 66 and the base 70 in the direction of arrow 116 of FIG. 6 from the locked position to an unlocked position. Such rotation allows the pin 54 to move on axis 65a into the disengaged position and out of the locking member aperture 40 of the blade 18 because the deep end 80 of the recess 76 is adjacent the pin 54 and the spring 60 moves the pin 54 out of the aperture 40. Meanwhile, sufficient rotation of the first actuator 66 causes the rods 82 to contact the second actuator 68 (i.e., ends of the recesses 100) to rotate the second actuator 68 in the direction of arrow 118 in FIG. 7 from the locked position to an unlocked position. Rotation of the second actuator 68 moves the deep end 92 of the recesses 88 adjacent the balls 62 and 64, which allows the balls 62 and 64 to move on axis 65b and out of the blade slot 46 and into the disengaged position. When the blade clamp 20 reaches the unlocked position, the recesses 114 (FIG. 10) of the base 70 are aligned with the pin 110 (FIG. 8) of the ejector mechanism 104, which allows the pin 110 to move into the recesses 114 and also allows the plunger 108 and the spring 112 to push the blade 18 out of the slot 46. With the pin 110 received in the recesses 114 of the base 70, the pin 110 retains the blade clamp 20 in the unlocked position against the bias of the torsion springs 84 and 94.

Referring to FIG. 8, to attach the blade 18 to the spindle 16, the user inserts the blade 18 into the slot 46 and eventually the blade 18 contacts the plunger 108 and pushes the plunger 108 against the bias of the spring 112 and moves the pin 110 out of the recesses 114 (FIG. 10) of the base 70. The torsion spring 84 automatically rotates the first actuator 66 toward the locked position (i.e., in the direction of the arrow 86 in FIG. 6) to push the pin 54 into the engaged position and into the locking member aperture 40 of the blade 18. The torsion spring 94 automatically rotates the second actuator 68 toward the locked position (i.e., in the direction of the arrow 96 in FIG. 7) to push the balls 62 and 64 into the engaged position and into the adjacent apertures 34 and 36 of the blade 18. The recesses 100 of the second actuator 68 allow for a limited amount of relative rotation between the first actuator 66 and the second actuator 68 so that both the first actuator 66 and the second actuator 68 can move to locked positions independently, which allows the blade clamp 20 to be used with blades having different dimensions (e.g., different blade thicknesses).

Figure 12:
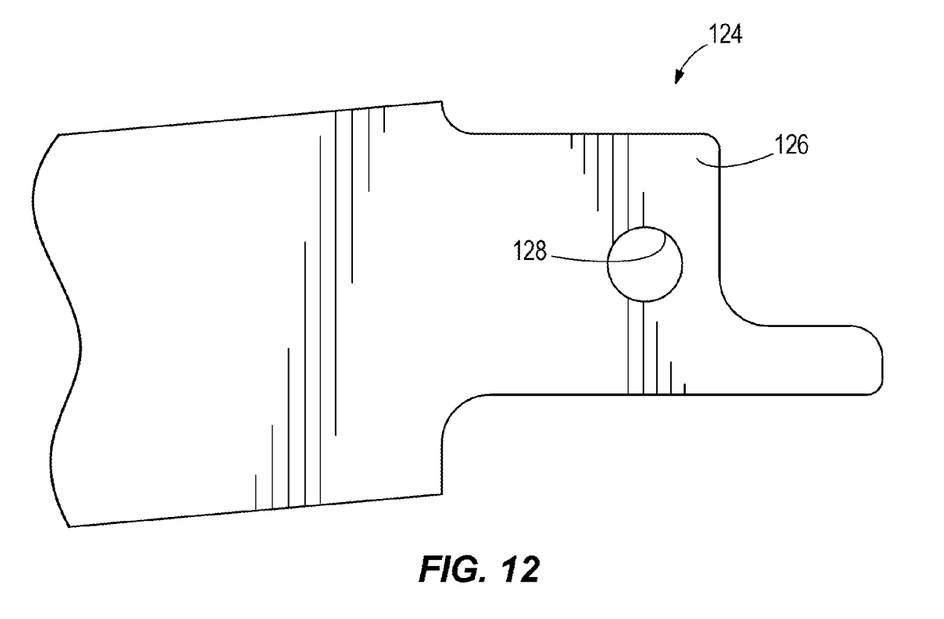
FIG. 12 is a side view of another saw blade for use with the saw of FIG. 1.

As another example of a different blade dimension, referring to FIG. 12, the blade clamp 20 can be used with a blade 124 having a tang 126 and a locking member aperture 128. The tang 126 does not include the semi-circular recesses 34 and 36 for receiving the balls 62 and 64 like the blade 18 of FIG. 11. However, because the first actuator 66 can rotate relative to the second actuator 68, the first actuator 66 can move the pin 54 into the locking member aperture 128 even though the balls 62 and 64 are unable to move into the blade slot 46 or only a small distance into the blade slot 46. Thus, the pin 54 can engage the blade 124 and lock the blade 124 to the spindle 16 regardless of whether the balls 62 and 64 can engage recesses in the blade 124.

Therefore, the invention provides, among other things, a blade clamp for a reciprocating saw that includes a first locking member (e.g., pin 54) and a second locking member (e.g., the balls 62 and 64) that engage a saw blade, but yet the blade clamp can be used with blades that do not include features for the second locking member and with blades having different blade thicknesses. Thus, the blade clamp can be used with multiple types of saw blades.

Various features and advantages of the invention are set forth in the following claims.

What is claimed is:

1. A reciprocating saw comprising:
   a spindle including a blade slot configured to receive a saw blade; and
   a blade clamp operable to removably couple the saw blade to the spindle, the blade clamp including,
      a first actuator pivotable about the spindle between a locked position and an unlocked position,
      a first locking member movable relative to the blade slot between an engaged position and a disengaged position in response to movement of the first actuator between the locked position and the unlocked position, the first locking member configured to engage the saw blade to couple the saw blade to the spindle when the first locking member is in the engaged position and the first locking member configured to allow removal of the saw blade from the blade slot when the first locking member is in the disengaged position,
      a second actuator pivotable about the spindle between a locked position and an unlocked position, and
      a second locking member movable relative to the blade slot between an engaged position and a disengaged position in response to movement of the second actuator between the locked position and the unlocked position, the second locking member configured to engage the saw blade to couple the saw blade to the spindle when the second locking member is in the engaged position and the second locking member configured to allow removal of the saw blade from the blade slot when the second locking member is in the disengaged position.

2. The reciprocating saw of claim 1, wherein the first actuator is pivotable with respect to the second actuator about the spindle.

3. The reciprocating saw of claim 2, wherein the first actuator is coupled to the second actuator to limit pivotal movement of the first actuator with respect to the second actuator about the spindle.

4. The reciprocating saw of claim 3, wherein the first actuator is coupled to the second actuator for co-rotation about the spindle when the first actuator pivots about the spindle toward the unlocked position.

5. The reciprocating saw of claim 1, further comprising a first biasing member that biases the first locking actuator toward the locked position and a second biasing member that biases the second locking actuator toward the locked position.

6. The reciprocating saw of claim 5, wherein the first biasing member includes a torsion spring, and wherein the second biasing member includes a torsion spring.

7. The reciprocating saw of claim 1, wherein the first actuator contacts the first locking member to move the first locking member into the engaged position.

8. The reciprocating saw of claim 1, further comprising a biasing member that biases the first locking member toward the disengaged position.

9. The reciprocating saw of claim 1, wherein the first actuator includes a recess that allows the first locking member to move toward the disengaged position when the first actuator is in the unlocked position.

10. The reciprocating saw of claim 1, wherein the second actuator contacts the second locking member to move the second locking member into the engaged position.

11. The reciprocating saw of claim 1, further comprising a third locking member movable relative to the blade slot between an engaged position and a disengaged position in response to movement of the second actuator between the locked position and the unlocked position, the third locking member configured to engage the saw blade to couple the saw blade to the spindle when the second and the third locking members are in the engaged positions and the third locking member configured to allow removal of the saw blade from the blade slot when the second and the third locking members are in the disengaged position.

12. The reciprocating saw of claim 11, wherein the second actuator contacts the second and the third locking members to move the second and the third locking members into the engaged positions.

13. The reciprocating saw of claim 12, wherein the second actuator includes a first recess that allows the second locking member to move toward the disengaged position when the second actuator is in the unlocked position, and wherein the second actuator includes a second recess that allows the third locking member to move toward the disengaged position when the second actuator is in the unlocked position.

14. The reciprocating saw of claim 11, wherein the second locking member is directly opposed to the third locking member.

15. The reciprocating saw of claim 11, wherein the first locking member moves on a first axis relative to the blade slot between the engaged and the disengaged positions, and wherein the second locking member moves on a second axis relative to the blade slot between the engaged and the disengaged positions, and wherein first axis is perpendicular to the second axis.

16. The reciprocating saw of claim 1, wherein the first actuator and the second actuator are coupled to the spindle so that the first and second actuators can pivot with respect to each other about the spindle and also so that the first actuator and the second actuator pivot about spindle together to allow the blade clamp to be used with saw blades having different tang configurations.

17. A reciprocating saw comprising:
- a spindle including a blade slot configured to receive a saw blade; and
- a blade clamp operable to removably couple the saw blade to the spindle, the blade clamp including,
  - a first actuator movable relative to the spindle between a locked position and an unlocked position,
  - a first locking member movable relative to the blade slot between an engaged position and a disengaged position in response to movement of the first actuator between the locked position and the unlocked position, the first locking member configured to engage the saw blade to couple the saw blade to the spindle when the first locking member is in the engaged position and the first locking member configured to allow removal of the saw blade from the blade slot when the first locking member is in the disengaged position,
  - a second actuator movable relative to the spindle between a locked position and an unlocked position, and
  - a second locking member movable relative to the blade slot between an engaged position and a disengaged position in response to movement of the second actuator between the locked position and the unlocked position, the second locking member configured to engage the saw blade to couple the saw blade to the spindle when the second locking member is in the engaged position and the second locking member configured to allow removal of the saw blade from the blade slot when the second locking member is in the disengaged position.

18. The reciprocating saw of claim 17, wherein the first locking member moves on a first axis relative to the blade slot between the engaged and the disengaged positions, and wherein the second locking member moves on a second axis relative to the blade slot between the engaged and the disengaged positions, and wherein first axis is perpendicular to the second axis.

19. The reciprocating saw of claim 18, wherein the first actuator is movable with respect to the second actuator about the spindle.

20. The reciprocating saw of claim 19, wherein the first actuator is coupled to the second actuator to limit pivotal movement of the first actuator with respect to the second actuator about the spindle, and wherein the first actuator is coupled to the second actuator for co-rotation about the spindle when the first actuator pivots about the spindle toward the unlocked position.

21. The reciprocating saw of claim 17, further comprising a third locking member movable relative to the blade slot between an engaged position and a disengaged position in response to movement of the second actuator between the locked position and the unlocked position, the third locking member configured to engage the saw blade to couple the saw blade to the spindle when the second and the third locking members are in the engaged positions and the third locking member configured to allow removal of the saw blade from the blade slot when the second and the third locking members are in the disengaged position.

22. The reciprocating saw of claim 17, wherein the first actuator and the second actuator are coupled to the spindle so that the first and second actuators can are movable with respect to each other relative to the spindle and also so that the first actuator and the second actuator are movable relative to the spindle together to allow the blade clamp to be used with saw blades having different tang configurations.

23. A reciprocating saw configured to be used with a first saw blade having a first tang configuration and also with a second saw blade having a second tang configuration different than the first tang configuration, the reciprocating saw comprising:
- a spindle including a blade slot configured to receive the first tang and the second tang; and
- a blade clamp operable to removably couple the first saw blade and the second saw blade to the spindle, the blade clamp including,
  - a first actuator pivotable about the spindle between a locked position and an unlocked position,
  - a first locking member movable relative to the blade slot between an engaged position and a disengaged position in response to movement of the first actuator between the locked position and the unlocked position,
  - a second actuator pivotable about the spindle between a locked position and an unlocked position, and
  - a second locking member movable relative to the blade slot between an engaged position and a disengaged position in response to movement of the second actuator between the locked position and the unlocked position,
- wherein the first actuator and the second actuator are coupled to the spindle so that the first and second actuators can pivot with respect to each other about the spindle and so that the first actuator and the second actuator pivot about spindle together to allow the blade clamp to be used with the first saw blade and the second saw blade.

* * * * *